(12) United States Patent
Mitchell

(10) Patent No.: US 10,107,682 B1
(45) Date of Patent: Oct. 23, 2018

(54) NON-CIRCULAR APERTURE REFLECTIVE IMAGER

(71) Applicant: Thomas A. Mitchell, Nazareth, PA (US)

(72) Inventor: Thomas A. Mitchell, Nazareth, PA (US)

(73) Assignee: Wavefront Research, Inc., Northampton, PA (US)

( * ) Notice: Subject to any disclaimer, the term of this patent is extended or adjusted under 35 U.S.C. 154(b) by 0 days.

(21) Appl. No.: 15/166,729

(22) Filed: May 27, 2016

Related U.S. Application Data

(60) Provisional application No. 62/167,528, filed on May 28, 2015.

(51) Int. Cl.
   *G01J 3/02* (2006.01)
   *G02B 17/00* (2006.01)
   *G02B 17/06* (2006.01)

(52) U.S. Cl.
   CPC ............... *G01J 3/021* (2013.01); *G01J 3/024* (2013.01); *G02B 17/008* (2013.01); *G02B 17/0615* (2013.01); *G02B 17/0636* (2013.01)

(58) Field of Classification Search
   CPC .. G01J 3/021; G01J 2617/0615; G01J 3/0636; G01J 3/008
   See application file for complete search history.

(56) References Cited

U.S. PATENT DOCUMENTS

| | | | |
|---|---|---|---|
| 2006/0268272 A1* | 11/2006 | Liphardt | G01J 3/02 356/369 |
| 2010/0208319 A1* | 8/2010 | Kessler | G02B 17/008 359/202.1 |
| 2011/0285995 A1* | 11/2011 | Tkaczyk | G01J 3/02 356/326 |
| 2014/0118604 A1* | 5/2014 | Denis | H04N 5/2254 348/345 |

\* cited by examiner

*Primary Examiner* — Dominic J Bologna
(74) *Attorney, Agent, or Firm* — Burns & Levinson LLP; Orlando Lopez

(57) ABSTRACT

Reflective imager sub-systems that have a non-circular entrance pupil and provide substantially increased throughput to a detecting component of a system are disclosed.

8 Claims, 4 Drawing Sheets

NON-CIRCULAR APERTURE REFLECTIVE IMAGER

CROSS REFERENCE TO RELATED APPLICATIONS

This application claims priority to and benefit of U.S. Provisional Application No. 62/167,528, filed May 28, 2015, entitled ELLIPTICAL APERTURE REFLECTIVE IMAGER, which is incorporated by reference herein in its entirety for all purposes.

STATEMENT OF FEDERALLY SPONSORED RESEARCH OR DEVELOPMENT

This disclosure was made with U.S. Government support from the U.S. Army under contract W15P7T-06-D-R401, subcontract R401-SC-20316-0252. The U.S. Government has certain rights in the invention.

BACKGROUND

These teachings relate generally to reflective optical imagers, and, more particularly, to a novel optical imager design that is compact and has a high throughput, or fast optical speed.

In some optical systems, it is often desirable for the imager component of the system to provide substantially increased throughput to the detecting component of the system. This can sometimes be difficult to achieve, particularly for reflective imagers, as a result of the obscuring nature of reflective systems as well as tradeoffs in size, spatial resolution, and other considerations.

For example, consider some applications of imaging sensors in which it is desirable to have a fine spatial resolution on the ground while simultaneously collecting as much imagery in as short a time as possible.

There is a need for a reflective imager component of a system that provides substantially increased throughput to the detecting component of the system.

SUMMARY

Reflective imager components that provide substantially increased throughput to a detecting component of a system are disclosed hereinbelow.

The embodiments of the present teachings provide reflective imager designs having a non-circular aperture and a high throughput, or fast optical speed.

For a better understanding of the present teachings, together with other and further needs thereof, reference is made to the accompanying drawings and detailed description and its scope will be pointed out in the appended claims.

DETAILED DESCRIPTION

Reflective imager components that provide substantially increased throughput to a detecting component of a system are disclosed hereinbelow.

The following detailed description presents the currently contemplated modes of carrying out the teachings. The description is not to be taken in a limiting sense, but is made merely for the purpose of illustrating the general principles of the teachings, since the scope of the teachings is best defined by the appended claims.

As used herein, the singular forms "a," "an," and "the" include the plural reference unless the context clearly dictates otherwise.

In some optical systems, it is often desirable for the imager component of the system to provide substantially increased throughput to the detecting component of the system. This can sometimes be difficult to achieve, particularly for reflective imagers, as a result of the obscuring nature of reflective systems as well as tradeoffs in size, spatial resolution, and other considerations.

For example, consider some applications of imaging sensors in which it is desirable to have a fine spatial resolution on the ground while simultaneously collecting as much imagery in as short a time as possible. Additionally, line scanning imagers, multispectral imagers, or hyperspectral imagers, which can have separate resolution requirements in the two orthogonal spatial dimensions, typically referred to as across-slit and along-slit dimensions, can benefit from an increased throughput and spatial resolution in one dimension over the other.

Additionally, the aperture size, or optical speed, of many typical off-axis reflective imaging systems are limited by the folding or packaging of the mirrors to avoid obscuration of the light. However, in the dimension orthogonal to the direction of folding, these limitations can be substantially relaxed. By increasing the aperture in this orthogonal direction, the overall throughput of the sensor can be significantly increased, and the resolution of the optical system can be increased in this same dimension. The non-circular aperture reflective imager of the disclosed teachings provides a compact imager consistent with meeting these requirements.

Figure 1A:
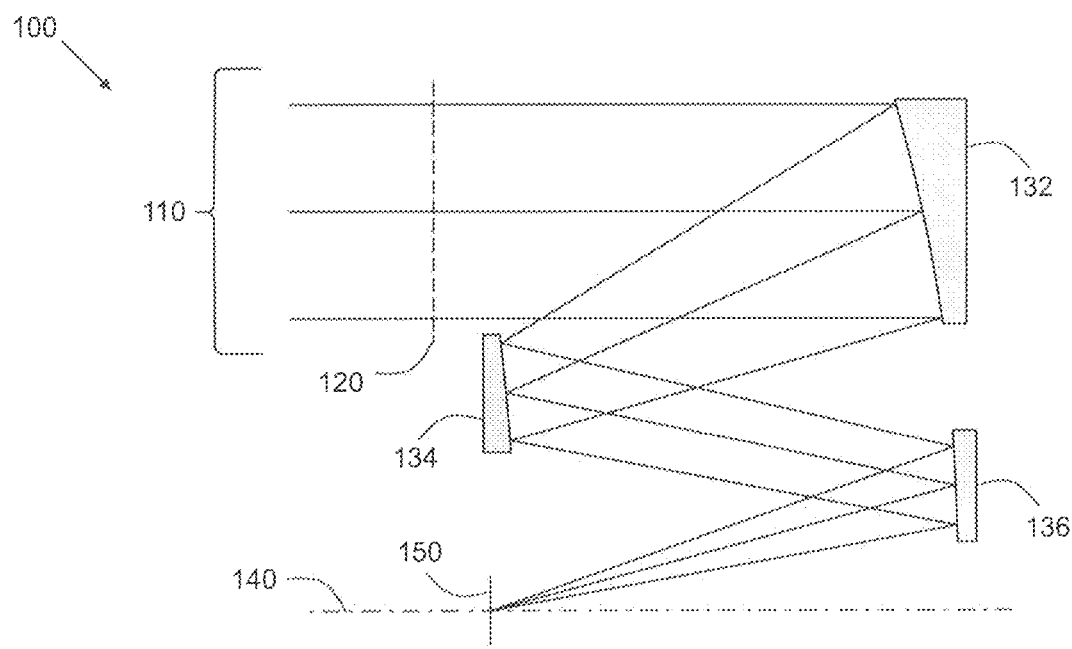
FIGS. 1A-1B are schematic views of an embodiment of the present teachings, taken along its optical axis.

Reference is made to FIG. 1A, which is a schematic view of an embodiment of the present teachings 100, taken along its optical axis. Electromagnetic radiation, typically in the ultraviolet, visible, and/or infrared bands, hereinafter referred to generally as light, emitted or reflected by a given object, either real or virtual, hereinafter referred to generally as the source 110 (actual source not shown), located at the object plane (not shown) is incident on the entrance pupil 120 of an imaging optical system. The imaging optical system of this embodiment includes three reflective elements 132, 134, and 136 that, in this embodiment, share a common optical axis 140, and is capable of substantially receiving the light from the source 110 and substantially imaging the light to a focus position (image plane) 150. In this plane and in this embodiment, the mirrors 132, 134, and 136 are off-axis sections of mirrors that are rotationally symmetric about the optical axis 140 and are positioned relative to one another to prevent obscuration of the light.

Figure 1B:
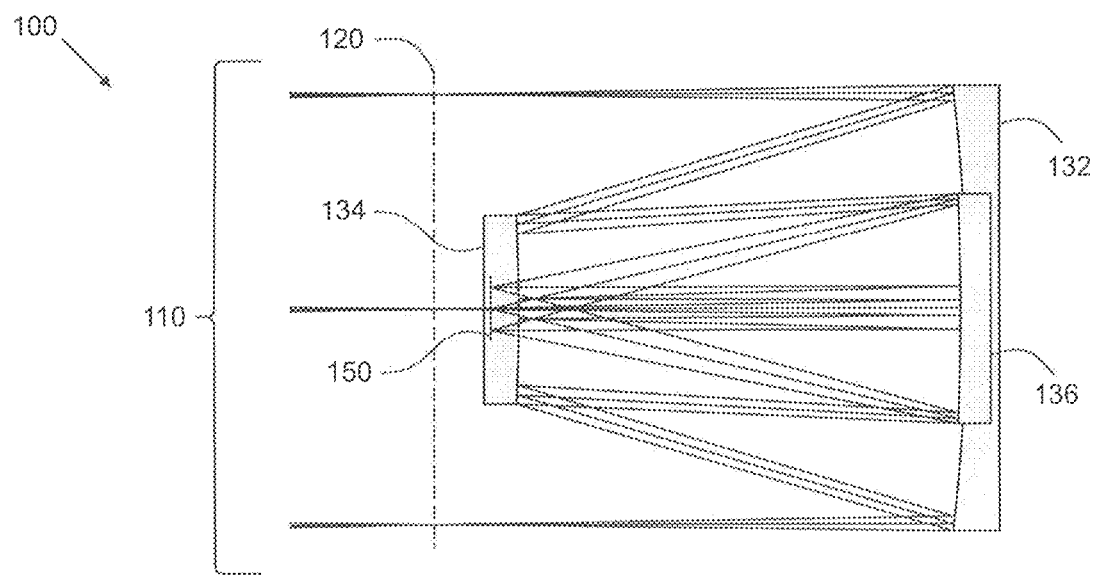

Reference is made to FIG. 1B, which is a schematic view of the embodiment of the present teachings 100 illustrated in FIG. 1A, taken along the optical axis in the plane orthogonal to that illustrated in FIG. 1A. Light from the source 110 (actual source not shown), located at the object plane (not shown) is incident on the entrance pupil 120 of an imaging optical system. The imaging optical system of this embodiment, which includes three reflective elements 132, 134, and 136, is capable of substantially receiving the light from the source 110 and substantially imaging the light to a focus position 150. In this plane the physical size of the entrance pupil 120 is larger than in the plane illustrated in FIG. 1B, and in this embodiment, the mirrors 132, 134, and 136 are axial sections of mirrors that are rotationally symmetric about the optical axis 140.

Figure 1C:
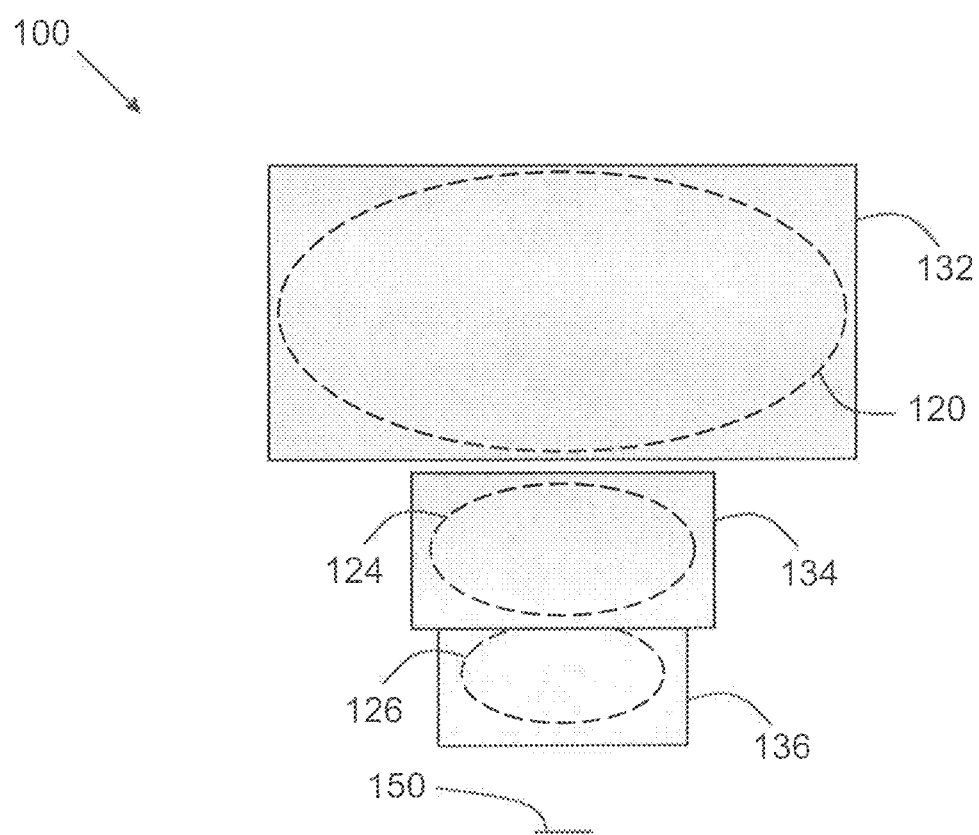
FIG. 1C is a schematic view of the embodiment of the present teachings illustrated in FIGS. 1A-1B, taken along a plane normal to its optical axis.

Reference is made to FIG. 1C, which is a schematic view of the embodiment of the present teachings 100 illustrated in FIG. 1A, taken along a plane orthogonal to the optical axis. The larger physical size of the entrance pupil 120 in the plane illustrated in FIG. 1B over that illustrated in FIG. 1A results in a non-circular entrance pupil 120, in this embodiment an ellipse, with larger collecting area than a circular entrance pupil having a diameter equal to the physical size of the entrance pupil 120 in the plane illustrated in FIG. 1A. The footprints 120, 124, and 126 that the light makes on each of the three mirrors 132, 134, and 136 respectively as it propagates through the optical system are shown in FIG. 1C.

The embodiment of the present teachings 100 illustrated in FIGS. 1A, 1B, and 1C has an increased throughput over that which is possible with a similar optical system having a circular aperture due to the larger aperture dimension, and consequently faster optical speed, that is used in the spatial dimension illustrated in FIG. 1B relative to that of the spatial dimension illustrated in FIG. 1A. The aperture dimension, or optical speed, of the imager in the dimension illustrated in FIG. 1A is sufficiently small enough to allow for compact folding of the optical system, but does not substantially impact the larger aperture dimension, or faster optical speed, in the dimension illustrated in FIG. 1B, as illustrated in FIG. 1C. In this manner, a non-circular aperture that is increased in size in a direction substantially orthogonal to the direction of folding of the optical system can provide a substantially increased throughput.

For example, the embodiment of the present teachings 100 used as the fore-optics of a slit-based spectrometer could provide for an increased spatial resolution in the along-slit dimension where the larger dimension of the non-circular aperture is substantially parallel to the along-slit dimension. This would also provide a substantially larger throughput to the spectrometer that would result in an overall increase in its sensitivity.

Figure 2A:
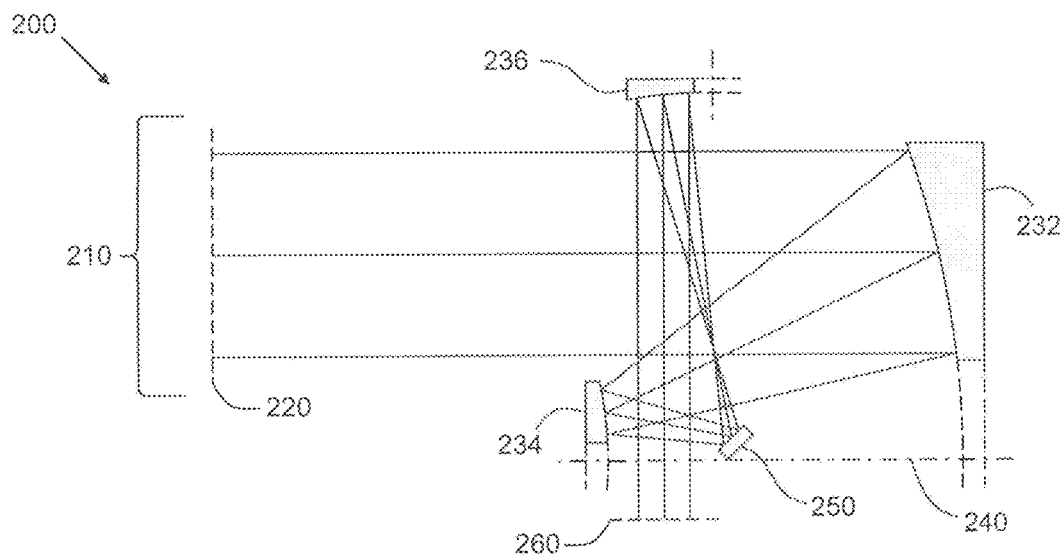
FIGS. 2A-2C are schematic views of other embodiments of the present teachings, taken along its optical axis.

Reference is made to FIG. 2A, which is a schematic view of another embodiment of the present teachings 200, taken along its optical axis. Light from a source 210 (actual source not shown) is incident on the entrance pupil 220 of an afocal optical system. The afocal optical system of this embodiment, that includes three reflective elements 232, 234, and 236 and a fold mirror 250, all of which, in this embodiment, share a common optical axis 240, is capable of substantially receiving the light 210 and substantially imaging the entrance pupil 220 to an exit pupil location 260. In this plane and in this embodiment, the mirrors 232, 234, and 236 are off-axis sections of mirrors that are rotationally symmetric about the optical axis 240 and are positioned relative to one another to prevent obscuration of the light. In this embodiment, the fold mirror 250 is optically disposed between the mirrors 232 and 234, which is capable of folding the optical axis 240 of the system.

Figure 2B:
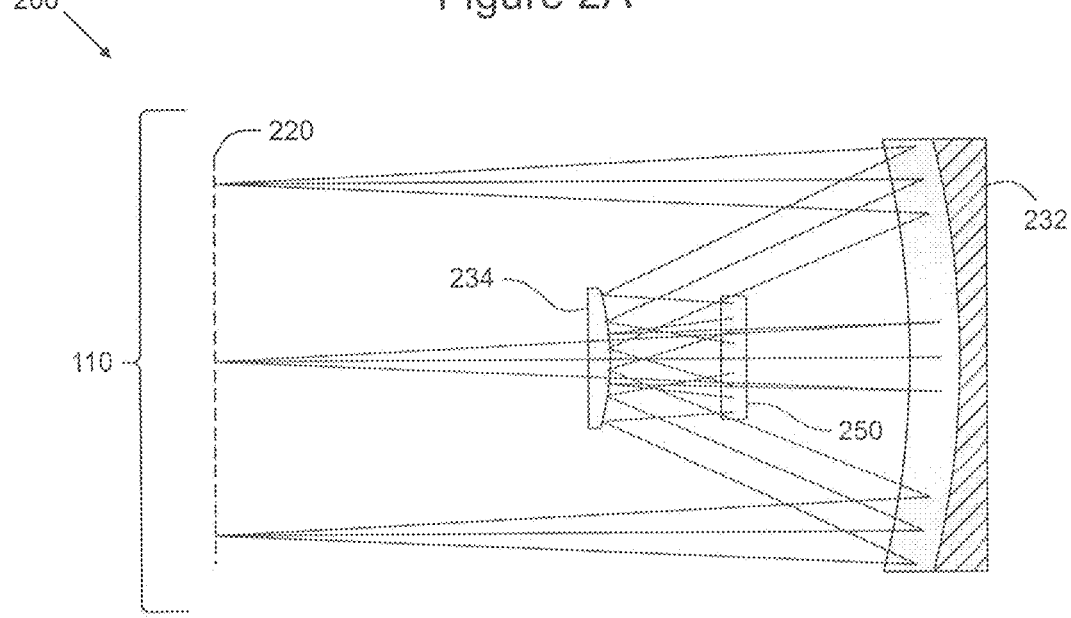

Reference is made to FIG. 2B, which is a schematic view of the embodiment of the present teachings 200 illustrated in FIG. 2A, taken along its optical axis in the plane orthogonal to that illustrated in FIG. 2A. In this plane, the physical size of the entrance pupil 220 is larger than in the plane illustrated in FIG. 2B, and results in a non-circular entrance pupil 220 with larger collecting area than a circular entrance pupil having a diameter equal to the physical size of the entrance pupil 220 in the plane illustrated in FIG. 2A.

Figure 2C:
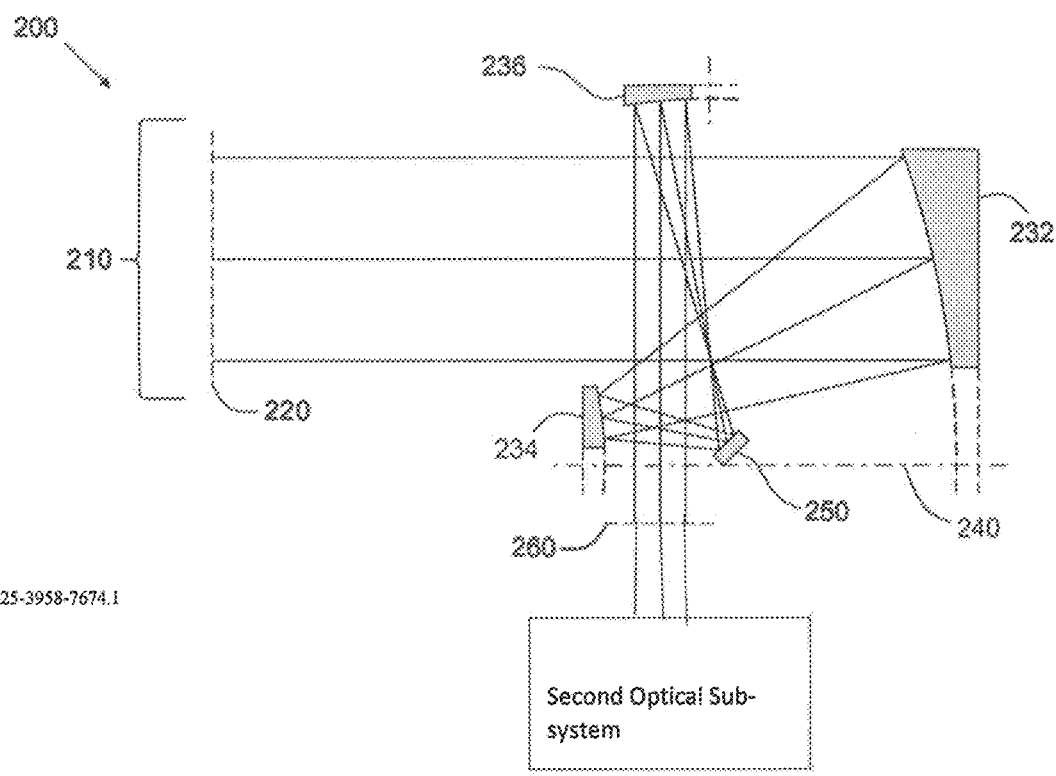

The embodiment of the present teachings 200 illustrated in FIGS. 2A, 2B, and 2C has an increased throughput over that which is possible with a similar optical system having a circular aperture due to the larger aperture dimension, and consequently faster optical speed, that is used in the spatial dimension illustrated in FIG. 2B relative to that of the spatial dimension illustrated in FIG. 2A. The aperture dimension, or optical speed, of the imager in the dimension illustrated in FIG. 2A is sufficiently small enough to allow for compact folding of the optical system, but does not substantially impact the larger aperture dimension, or faster optical speed, in the dimension illustrated in FIG. 2B, as illustrated in FIG. 2C. In this manner, a non-circular aperture that is increased in size in a direction substantially orthogonal to the direction of folding of the optical system can provide a substantially increased throughput.

For example, the embodiment of the present teachings 100 used as the fore-optics of a second optical sub-system, such as a slit-based spectrometer, could provide for an increased spatial resolution in the along-slit dimension where the larger dimension of the non-circular aperture is substantially parallel to the along-slit dimension (see FIG. 2C). The second optical sub-system can be a multispectral imaging system or a hyperspectral imaging system. This would also provide a substantially larger throughput to the spectrometer that would result in an overall increase in its sensitivity.

Any number of optical elements, reflective or refractive, can be used in the embodiments of the present teachings, and the non-circular entrance pupil shape can be any shape other than circular, including but not limited to, elliptical and rectangular shapes.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue. When used in regard to angular relationships which would require an exact determination, a feat not achievable in practice due to measurement inaccuracies, one skilled in the art would know that the accuracy required may depend on the size of the system and would be able to determine the required accuracy.

Although the teachings have been described with respect to various embodiments, it should be realized these teachings are also capable of a wide variety of further and other embodiments within the spirit and scope of the appended claims.

What is claimed is:

1. An optical system comprising:
    an entrance pupil, said entrance pupil having a substantially non-circular shape, said entrance pupil being hereinafter referred to as a non-circular entrance pupil; and
    an optical system having at least one reflective optical element, said optical system being configured to receive electromagnetic radiation received from the non-circular entrance pupil, said optical system being configured to image electromagnetic radiation from the entrance pupil onto an image plane;
    said optical system having at least one optical element having an aperture that is an off-axis section;
    said entrance pupil having a first physical size in a first plane containing said off-axis section;

said entrance pupil having a second physical size in a second plan that is perpendicular to said first plane; and said second physical size being larger than said first physical size.

2. The optical system of claim 1 wherein said entrance pupil is elliptical in shape.

3. The optical system of claim 1 further comprising at least one detecting element located substantially at the image plane.

4. An optical system comprising:
- an entrance pupil, said entrance pupil having a substantially non-circular shape, said entrance pupil being hereinafter referred to as a non-circular entrance pupil; and
- a first optical sub-system having at least one reflective optical element, said first optical sub-system being configured to receive electromagnetic radiation from the non-circular entrance pupil, said first optical sub-system being substantially afocal, and said first optical sub-system configured to collimate electromagnetic radiation received from the entrance pupil onto an exit pupil;
- said first optical sub-system having at least one optical element having an aperture that is an off-axis section;
- said entrance pupil having a first physical size in first plane containing said off-axis section;
- said entrance pupil having a second physical size in a second plane that is perpendicular to said first plane; and
- said second physical size being larger than said first physical size.

5. The optical system of claim 4 wherein said entrance pupil is elliptical in shape.

6. The optical system of claim 4 further comprising a second optical sub-system, said second optical sub-system being optically disposed to receive electromagnetic radiation from said first optical sub-system.

7. The optical system of claim 6 wherein said second optical sub-system is a multispectral imaging system.

8. The optical system of claim 6 wherein said second optical sub-system is a hyperspectral imaging system.

* * * * *